United States Patent [19]

Riley

[11] Patent Number: 4,674,194

[45] Date of Patent: Jun. 23, 1987

[54] RAILHEAD PROFILE MEASURING APPARATUS

[75] Inventor: Timothy W. Riley, Kardinya, Australia

[73] Assignee: Acet Limited, Osborne Park, Australia

[21] Appl. No.: 878,840

[22] PCT Filed: Sep. 23, 1985

[86] PCT No.: PCT/AU85/00231

§ 371 Date: May 21, 1986

§ 102(e) Date: May 21, 1986

[87] PCT Pub. No.: WO86/01886

PCT Pub. Date: Mar. 27, 1986

[30] Foreign Application Priority Data

Sep. 21, 1984 [AU] Australia .............................. PG7244

[51] Int. Cl.$^4$ ............................................. G01B 7/28
[52] U.S. Cl. ...................................... 33/551; 33/1 Q; 33/144
[58] Field of Search ................. 33/551, 553, 1 Q, 287, 33/338, 144

[56] References Cited

U.S. PATENT DOCUMENTS

| | | | |
|---|---|---|---|
| 3,864,039 | 2/1975 | Willmarth | 33/287 |
| 4,040,738 | 8/1977 | Wagner | 33/287 |
| 4,069,590 | 1/1978 | Effinger | 33/1 Q |
| 4,181,430 | 1/1980 | Shirota et al. | 33/287 |
| 4,288,926 | 9/1981 | Long et al. | 33/1 Q |

Primary Examiner—Willis Little
Attorney, Agent, or Firm—Dorsey & Whitney

[57] ABSTRACT

An apparatus for determining the profile of a longitudinal portion of an elongate member such as a railway rail comprising a base frame (1), an arm (6) mounted on said base frame for privotal movement relative thereto about a fixed axis (21), the base frame being capable of being releasably secured to the elongate member with the pivot axis of the arm in a plane substantially parallel to the direction of elongation of the elongate member and inclined to said direction of elongation. The arm (6) has or is adapted to have secured thereto a ranging device (3) having a ranging line (22) so that when the ranging device is fitted said ranging line (22) intersects the pivot axis (21) of the arm within the portion (42) of the elongate member that the profile is to be determined.

12 Claims, 5 Drawing Figures

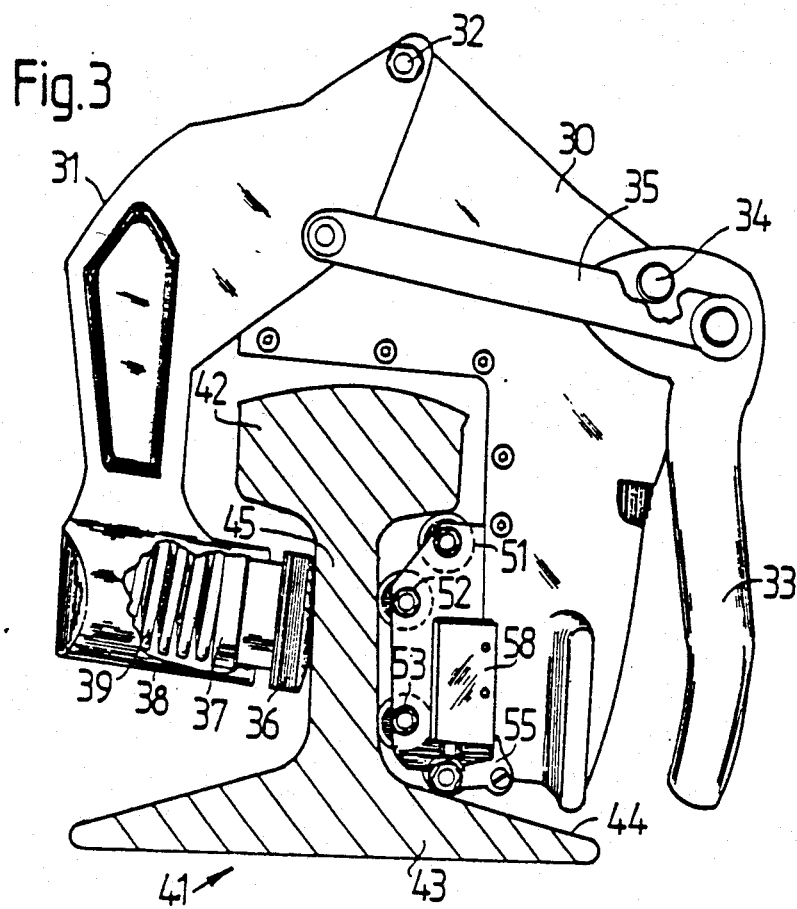

RAILHEAD PROFILE MEASURING APPARATUS

This invention relates to apparatus for determining the profile of the head of a rail as used in railways and tramways. It will be appreciated that the apparatus may be used in connection with other like elongated members having an enlarged head or like portion extending in the longitudinal direction thereof.

Various apparatus has been disclosed in prior published patent specification for examining rail tracks, such as disclosed in U.S. Pat. Nos. 3,517,307 and 3,924,461 and Australian Patent application No. 48795/79. These prior disclosures each have limitations in regard to the extent of the profile that may be checked or measured in a single set-up of the apparatus. In particular, the prior proposals are not capable of operating on the underside of the rail head in the same set-up of the apparatus as used to operate on the top and side surfaces of the rail head.

It is therefore the principle object of the present invention to provide an apparatus for determining the profile of a longitudinal portion of an elongated member such as a rail, that is effective in use and can scan the profile over a wide angle of rotation.

With this object in view, there is provided apparatus for determining the profile of a longitudinal portion of an elongate member comprising a base frame, an arm mounted on said base frame for pivotal movement relative thereto about a fixed axis, means to releasably secure the base frame to the elongate member with the pivot axis of the arm in a plane substantially parallel to the direction of elongation of the elongate member and inclined to said direction of elongation, said arm being adapted for securement thereto of a ranging device having a ranging line so that when the ranging device is fitted said ranging line intersects the pivot axis of the arm within the portion of the elongate member that the profile is to be determined.

Conveniently, the means to releasably secure the base frame to the elongate member is adapted so that the pivot axis of the arm is located in the longitudinal axial plane of the elongate member when the base frame is so secured. Preferably, means are provided to sense the angular position of the arm about its axes of rotation relative to a fixed datum on the base frame.

Conveniently, the ranging device emits a light beam, and the device is fitted to the arm so the axis of the beam intersects the pivot axis of the arm within the profile to be determined.

The disposition of the pivot axis of the arm, inclined as above discussed, enables the ranging device to rotate through an angle of rotation in excess of 90° on either side of the central position wherein ranging device is vertically above the pivot axes of the arm. Conveniently, the ranging device can move through up to 120° on either side of the central position, and preferably through an angle of 170° on either side of the central position.

This extent of movement will enable the ranging device, when fitted to a railway rail, to provide, in the one set-up of the apparatus on the rail, readings over the full width of the rail head, down the full height of each side of the rail head, and across at least part of the underface of the rail head on each side of the rail web. This extent of coverage of a rail head profile has not been possible with previously known equipment.

The invention will be more readily understood from the following description of one practical arrangement of the profile measuring apparatus as depicted.

In the drawings;

FIG. 3 is an end view of the apparatus in FIG. 1 showing in detail the mounting asembly, and FIG. 4 shows opposite side views of a replaceable roller assembly for the mounting assembly.

Figure 1:
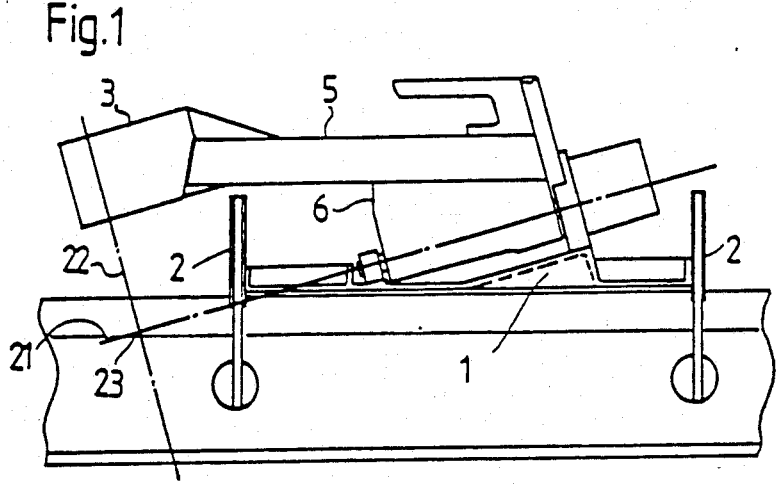
FIG. 1 is a side elevation of the apparatus fitted to a rail of a railway.

Referring now to the drawings, the apparatus comprises a base frame 1 having a mounting assembly 2 secured to each end of the base frame 1 whereby the base frame may be mounted in a longitudinal disposition on a conventional rail by means of the mounting assemblies 2. Rotatably mounted on the base frame 1 is the arm assembly 6 having a range finding device 3 attached to one end thereof.

The stationary shaft 10 is threadably secured at the end 20 to the block 12 rigid with the base frame 1. The other end of the shaft 10 is supported in the bearing 8 mounted in the carrier 11 which in turn is rotatably supported in the bearing 9 mounted in the bracket 13 secured to the base frame 1.

The carrier 11 is secured to arm 6 and the bearing 7 is mountedin the arm 6 and supported on the shaft 10. It will thus be seen that the shaft 10 and carrier 11 together with bearings 7, 8 and 9 rotatably support the arm 6 on the base frame 1 for rotation about the axis of the shaft 10 which is indicated at 21 in FIGS. 1 and 2.

Figure 2:
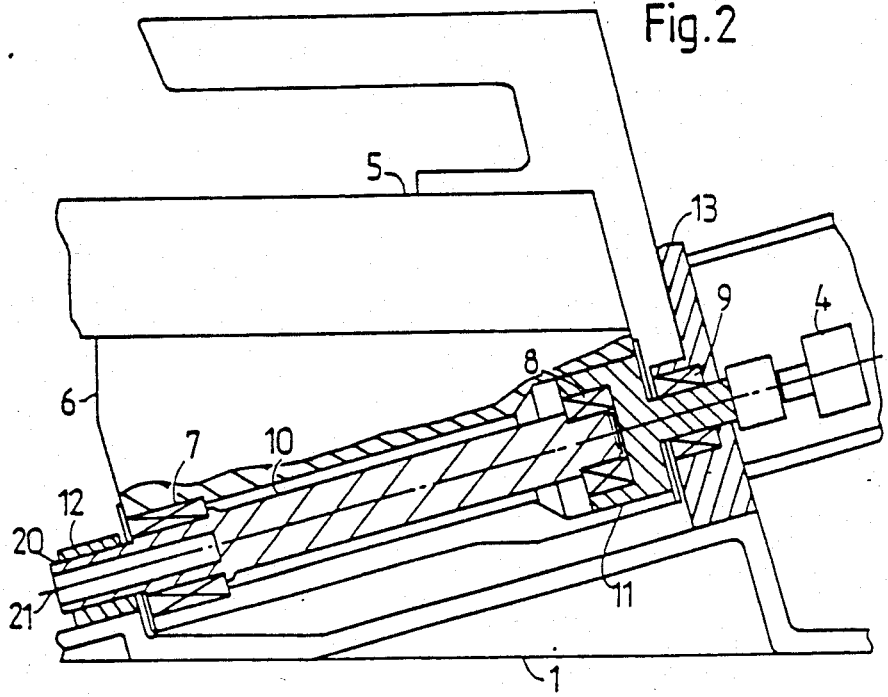
FIG. 2 is an enlarged part elevational view partly in section.

The range finding device 3 attached to the end of the arm 6 has a ranging beam having an axis 22 which intersects the pivot axis 21 at the point 23 shown in FIG. 1. The beam axis 22 and pivot 21 are arranged so that the point of intersection 23 is located within the head portion 43 of the rail, and so that the axis 22 may rotate through an angle greater than 90 degrees on either side of a central position directly above the rail head. The nature and extent of the movement of the ranging device will be described further hereinafter. The rotary type potentiometer 4 has a movable element attached to the carrier 11 so that the position of the movable arm of the potentiometer is directly related to the position of the element 6 and ranging device 3 about the pivot axis 21.

The mounting assembly 2 at either end of the base frame 1 are shown in more detail in FIGS. 3 and 4. Each mounting assembly comprises a fixed bracket 30 rigidly attached to the base frame 1 and a movable arm 31 pivotally connected at 32 to the fixed bracket 30. The operating lever 33 is pivotally attached at 34 to the bracket 30. The pivot connections 32 and 34 each have substantially horizontal axises which are parallel to the direction of rail when the apparatus is in working relation thereto . The operating lever 33 is connected by a link 35 to the pivoted arm 31 so that the pivotal movement of the operating lever 33 relative to the bracket 30 will affect corresponding pivotal movement of the arm 31 with respect to the bracket 30. This operation will be described in more detail hereinafter.

The lower end of the pivoted arm 31 carries a clamp head 36 having a part spherical surface directed towards the webb portion 45 of the rail 41. The clamp head 36 has a guide flange 37 slidably supported in the cavity 38 formed within the lower portion of the pivotal arm 31. The guide flange 37 is engaged by the compression spring 39, also located within the cavity 38, so that the clamping pressure is transmitted from the arm 31 to the clamp head 36 through the spring 39.

The fixed bracket 30 carries a series of three rollers 51, 52 and 53, each mounted on the bracket 30 for rotation about respective fixed axises parallel to the longitudinal direction of the rail 41. The three rollers are located so that rollers 52 and 53 will engage the substantially vertical wall of the webb 45 of the rail whilst the roller 51 will engage the underside of the rail head 42.

The fourth roller 54 is mounted on the arm 55 which is pivotally attached at 56 to the bracket 30. The roller 54 is positioned to engage the upper surface of the base flange 43 of the rail when the other three rollers are in engagement with the respective parts of the rail as previously referred to. The push rod 57 is slidably supported in the spring housing 58 attached to the bracket 30. With the spring housing 58 in a compression spring not shown which urges the push rod 57 in a downward direction. The lower end of the push rod 57 engages the arm 55 and thus, the action of the spring tends to force the roller 54 downward into engagement with the upper inclined face of the rail flange 43. The reaction force created in the bracket 30 will tend to force the roller 51 into engagement with the undersurface of the rail head 42.

In order to fit the profile measuring apparatus to a conventional track rail, the operating lever 33 of each mounting assembly 2 is raised from the position shown in FIG. 3 to a horizontal or above horizontal position. This will cause the link 35 to affect pivotal movement of the arm 31 about the pivot axis 32 so that the clamp head 36 is displaced sufficiently to the left as viewed in FIG. 3 so that the rail head 42 may pass between the clamp head 36 and the rollers 52 and 53 on the bracket 30. With each of the mounting assemblies in this open position, the profile measuring apparatus may be lowered into position over the the rail head and correspondingly may be withdrawn from about the rail when removal of the apparatus is required.

After each of the mounting assemblies have been located about the rail with the pivoted arm 31 in the open position, the operator may actuate the operating lever 33 of each mounting assembly 2 by downward pivotal movement thereof to bring the clamping heads 36 into engagement with the web of the rail. After initial contact between the clamp heads and the rail web has been established, further movement of the operating lever 33 into the final closed position will cause both the series of rollers 51, 52, 53 and 54 to be brought into pressure engagement with the relevant parts of the rail on one side of the central plane thereof whilst the clamp head is brought into engagement on the opposite side of the central plane. As previously described, the movement of the arm 31 to close about the rail head will cause compression of the spring 39 so that a controlled pressure is established between the clamp head 36 and the rail web with a similar reaction pressure being established between the rollers 51 52, 53 and 54 and the opposite side of the rail.

Accordingly, it will be appreciated that in this way, both of the mounting assemblies are firmly clamped to the rail at longitudinal spaced locations to thereby accurately position the pivot axis 21 of the arm 6 and the axis of the ranging beam 22 in the desired location with respect to the rail head 42. The rollers 52 and 53 determine the position of center 22 crosswise of the rail profile, and the roller 50 determines that position in the direction of the height of the rail.

This positive location is achieved by the fact that the rollers 52 and 53 are firmly seated against the surface of the web 45 of the rail and the roller 51 is firmly seated against the underside of the rail head 52 at a fixed location with respect to the surface of the rail web. In this regard, it will be appreciated that since the upper face 44 of the rail flange 43 is inclined upwardly and inwardly as seen in FIG. 3 the clamping action between the bracket 30 and the pivoted arm 31 will cause the roller 54 to move upwardly along the inclined face 44. The reaction to the resulting pressure developed in the spring acting on the push rod 57 will ensure that the roller 51 is pressed firmly against the underside of the rail head 42.

It will be understood that the side faces of the web 45 and the underface of the rail head 42 are not subject to wear when the rail is in use and accordingly, these surfaces provide an effective datum from which the centre of rotation of the ranging beam can be accurately located with respect to the rail head 42. As the principal wear on the rail occurs on the top face of the rail head, and the side face of the rail head directed inwardly with respect to the track (known as the 'gauge face'), the apparatus is preferably fitted to the rail with the fixed bracket 30 on the outer side of the rail.

It will be noted that the link 35 occupies an overcentre relationship to the pivot axis 34 of the operating level 33, when the latter is in the clamped position, so that it will lock in this position and require specific application of manual force to release the operating lever 33.

With the mounting assemblies 2 positively clamped to the rail with the rollers 51, 52, 53 and 54 accurately located with respect to the web and underside of the rail head, the base frame 1 and the pivot axis 21 of the arm 6 are accurately located with respect to the rail head 42 so that by pivotal movement of the ranging device 3 about the axis 21 the ranging device will provide accurate measurements of the surface of the rail head with respect to the centre 23 constituted by the intersection of the axis of the beam 22 of the ranging device with the pivot axis 21 of the arm 6. Also because of the location of the centre 23 and the inclination of the pivot axis 21 the ranging device 3 can make readings with respect to the underface of the rail head. This being an unworn part of the rail and providing a suitable datum for comparison of the profile of the rail under test with the profile of an unworn rail.

Railway rails are produced in a range of sizes having a different load carrying capacities. All such rails have the same basic cross-sectional shape but differ in actual dimensions. Accordingly it is desirable to provide a detachable unit 59 supporting the rollers 51, 52, 53 and 54 and spring housing 58, such as shown in FIG. 4. Specific units may be provided for each size rail commonly in use and the appropriate unit is attached to the bracket 30 to suit the rail to be measured. The unit is attached to the bracket 30 by bolts passing through the holes 60 provided in the units 59.

The ranging device 3 mounted on the arm 6 may be of any suitable type and conveniently is of the reflected light beam type such as that marketed under the trade mark "Optocator" by Selective Electronic Co. AB of Sweden and Selective Electronic Inc. of United States of America. In this particular device, a laser beam is directed onto the surface being measured and the reflected beam is picked up by a detector which generates a signal related to the distance of the surface from the detector. The signal may be in various forms, but preferably is in a digital format that may be visually displayed and/or modified for input to a processor.

The output from the potentiometer 4 may also be recorded in a manner to indicate the angular position of the light beam about the axis of rotation 21 and related to the ranging measurements so that the profile of the section of the rail under examination may be plotted. The plot of the profile may be made manually from digital information records or the processor may be arranged to produce a visual display of the profile.

The claims defining the invention are as follows:

I claim:

1. Apparatus for mounting a ranging device or the like along an elongate member, said ranging device defining a ranging line and usable for determining the profile of a longitudinal portion of said elongate member, comprising a base frame, an arm mounted on said base frame for pivotal movement relative thereto about a fixed axis, means to releasably secure the base frame to the elongate member with the pivot axis of the arm in a plane substantially parallel to the direction of elongation of the elongate member and inclined to said direction of elongation, said arm being adapted for securement thereto of said ranging device or the like such that said ranging line intersects the pivot axis of the arm within the portion of the elongate member that the profile is to be determined.

2. Apparatus as claimed in claim 1 wherein the means to releasably secure include elements positioned to in use engage selected locations on the external surface of the elongated member to thereby establish the position of the intersection of the ranging line and the pivot axis of the arm.

3. Apparatus as claimed in claim 2, wherein said elements are arranged to establish said position of intersection in two mutually perpendicular directions.

4. Apparatus as claimed in any one of claims 1 to 3, wherein means are provided to sense the angular position of the arm about its pivot axis relative to the frame.

5. Apparatus as claimed in claim 4, wherein the means to sense the angular position of the arm is a potentiometer operatively coupled to the arm whereby the resistance of the potentiometer is varied in response to movement of the arm about its axis.

6. Apparatus as claimed in any one of claims 1, 2, or 3, adapted to determine the profile of the head of a railway rail.

7. Apparatus as claimed in claim 2 or 3 adapted to determine the profile of the head of a railway rail, said rail having a base flange, a web upstanding from the base flange and a rail head at the upper end of the web to co-operate with a rail vehicle wheel, said elements of the releasably securing means being arranged to in use engage a surface of said rail web and a surface of the rail head that is not contacted by the vehicle wheel when the rail is in use.

8. Apparatus as claimed in claim 2 or 3 wherein the means to releasably secure the base frame to the elongate member includes two mounting assemblies arranged to engage in use the elongate member at respective locations spaced in the direction of elongation of the member, each mounting assembly including at least two said elements to engage the elongate member.

9. Apparatus for determining the profile of a longitudinal portion of an elongate member comprising a base frame, a ranging device mounted on said base frame for pivotal movement relative thereto about a fixed axis, means to releasably secure the base frame to the elongate member with the pivot axis of the arm in a plane substantially parallel to the direction of elongation of the elongate member and inclined to said direction of elongation, said ranging device having a ranging line so that when the base frame is fitted to an elongate member said ranging line intersects the pivot axis of the ranging device within the portion of the elongate member that the profile is to be determined.

10. A method for determining the profile of a longitudinal portion of an elongate member comprising supporting a ranging device for pivotal movement relative to the member about a fixed axis, located in a plane substantially parallel to the direction of elongation of the elongate member and inclined to said direction of elongation, so that the ranging device having a ranging line that intesects the pivot axis thereof within the portion of the elongate member that the profile is to be determined, and effecting ranging measurement of the profile of said portion of the elongate member at a plurality of positions of the ranging device about said axis.

11. Apparatus as claimed in claim 9, said elongate member comprising a railway having a railhead, said apparatus adapted for determining the profile of said railhead.

12. The method as claimed in claim 10, said elongate member comprising a railway rail having a railhead, said ranging device adapted for determining the profile of said railhead.

* * * * *